United States Patent

Pask et al.

[11] 3,931,566
[45] Jan. 6, 1976

[54] TEMPERATURE COMPENSATED CURRENT SENSING CIRCUIT FOR A POWER SUPPLY

[75] Inventors: Geoffrey John Pask; Anastasios Moschopoulos, both of Ottawa, Canada

[73] Assignee: Northern Electric Company Limited, Montreal, Canada

[22] Filed: Dec. 10, 1974

[21] Appl. No.: 531,341

[52] U.S. Cl. .................. 323/4; 323/17; 323/20; 323/68; 323/94 R; 323/DIG. 1; 338/32 R
[51] Int. Cl.² .......................................... G05F 1/58
[58] Field of Search .......... 323/17, 9, DIG. 1, 94 H, 323/94 R, 68, 69, 70, 4, 20; 338/32 R; 324/45, 46; 336/55

[56] References Cited
UNITED STATES PATENTS

| 3,172,032 | 3/1965 | Hunt | 323/94 H |
| 3,388,318 | 6/1968 | O'Brien | 323/20 |
| 3,462,673 | 8/1969 | Hieronymus | 323/94 H |

FOREIGN PATENTS OR APPLICATIONS

| 2,010,384 | 9/1971 | Germany | 323/DIG. 1 |
| 1,385,226 | 3/1964 | France | 338/32 R |

*Primary Examiner*—Gerald Goldberg
*Attorney, Agent, or Firm*—Frank Turpin

[57] ABSTRACT

A converter power supply is provided with a novel current regulating circuit. A magnetoresistive element is disposed in flux coupling proximity to the output inductor of a power supply for providing a control signal corresponding to the output current thereof. The element is mounted in the air gap of the split-loop core of the inductor.

1 Claim, 2 Drawing Figures

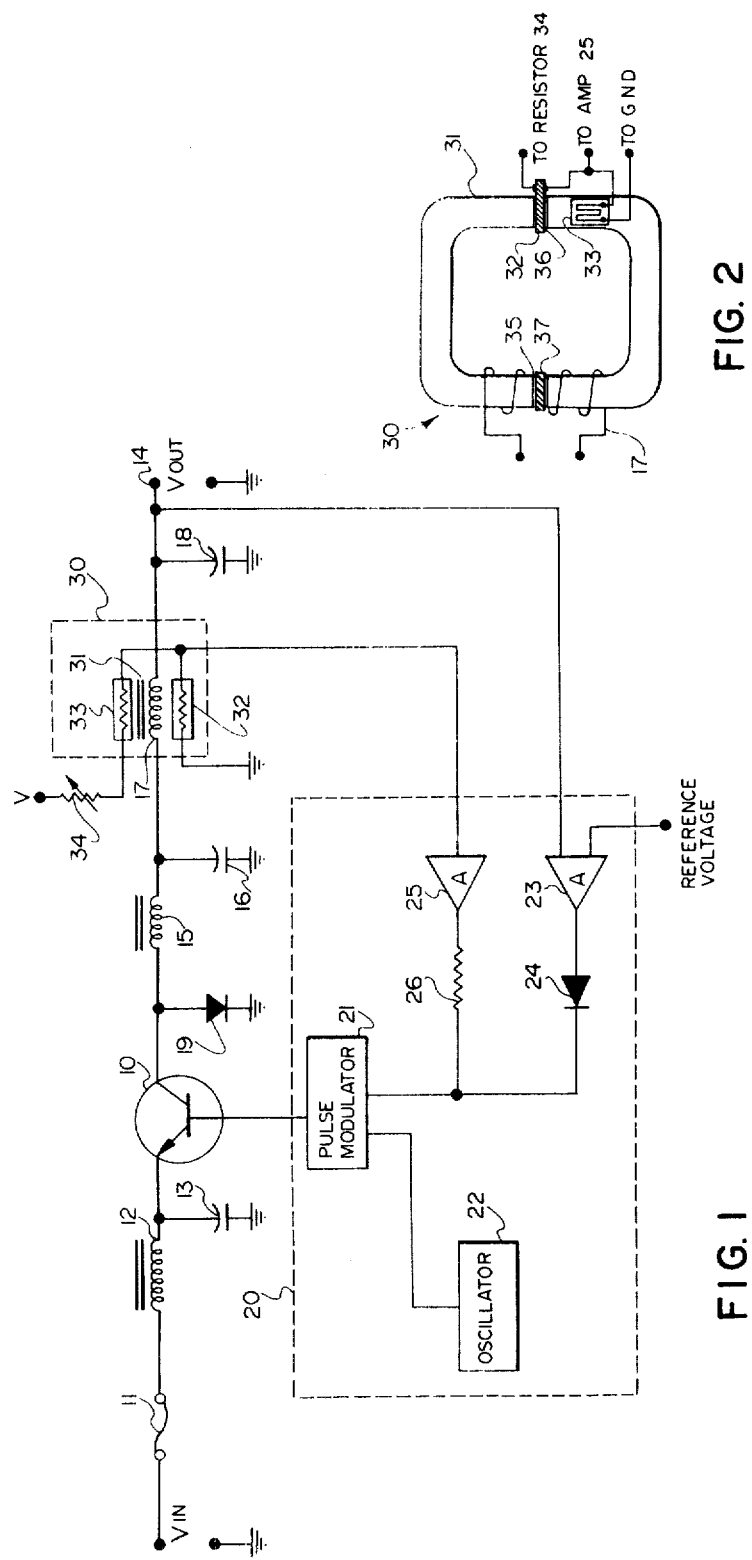

TEMPERATURE COMPENSATED CURRENT SENSING CIRCUIT FOR A POWER SUPPLY

This invention relates generally to power supplies and more particularly to a power supply incorporating a novel current sensing circuit.

A regulated power supply is normally provided with a current sensing circuit so that its output current may be held within predetermined limits. A conventional means of sensing the output current of a power supply circuit is to connect a resistance element in series with one of the output leads. The voltage drop across the resistance element is monitored and the series pass transistor is controlled accordingly to allow more or less current to flow therethrough. However, because this resistance element is in series with the output lead of the supply, a power loss occurs across it, causing the resistance characteristic of the element to vary with the amount of current drawn from the supply. This resistance variation must be compensated by the regulator circuitry.

It has been found that the current sensing function at the output of a power supply may be provided by a novel current sensing device incorporating a magnetoresistive element. Magnetoresistive elements have been known for a few years. Magnetoresistors are semiconductors whose resistance characteristic varies with the intensity of the magnetic field to which they are exposed. Such elements have been used mostly in laboratory measuring instruments. More specifically, they have been used as replacements for Hall-effect devices in such applications as amplifiers, polyphase wattmeters, modulators and voltage multipliers. In the last few years, magnetoresistive elements have been proposed for use in magnetic bubble memories as detectors for the movement of the bubble domains in ferrite sheets. On the other hand, our invention results in a practical device which may be used to control the output current of almost any power supply.

In accordance with the invention, a current sensing device for a power supply is obtained by connecting an inductor comprising a coil wound on a magnetic core having a gap, in series with an output terminal of the supply. A magnetoresistive element positioned in flux coupling proximity to the inductor provides a control signal corresponding to the current flowing through the coil of the inductor to the current control circuit of the supply.

This circuit exhibits the advantage that the current sensing element of the power supply is isolated from the output current path thereof.

The resistance of a magnetoresistor is also proportional to the ambient temperature to which it is subjected. Therefore, if more accurate current regulation of the supply is required, a second magnetoresistor may be secured in heat sensing contact to the core of the inductor in such a way that it is substantially unaffected by the flux therein. The terminals of this resistor may then be connected into the current control circuit in a manner such that thermal drift of the circuitry is compensated.

An example embodiment of the invention will now be described in conjunction with the drawings in which:

FIG. 1 is a schematic block diagram of a power supply incorporating a current sensing circuit in accordance with the invention; and FIG. 2 is a pictorial view of an example embodiment of the current sensing circuit shown in FIG. 1.

FIG. 1 illustrates a switched converter power supply embodying a current sensor circuit in accordance with the invention. The input voltage to the supply is applied to the emitter electrode of a series-pass transistor 10 via a fuse 11 and an inductor 12 which together with a capacitor 13 form an input filter for the supply. The collector electrode of transistor 10 is connected to an output terminal 14 via a choke 15 which together with capacitor 16 form an output filter for the supply, and an inductor 17 which together with a capacitor 18 normally form a spike suppression circuit for a switched power supply. The inductor 17 is also part of a current sensing circuit 30 which will be described later. A diode 19 is also connected between ground and the collector electrode of the transistor 10 for providing a path for the load current to flow when the transistor 10 is cut-off or blocking.

A control circuit 20 is connected to the base electrode of transistor 10 for controlling the current therethrough. As is well known in the art, the control circuit 20 comprises a pulse modulator 21 having its output connected to the base electrode of transistor 10 and one of its inputs connected to an oscillator 22. Another input of the control circuit 20 is connected to a voltage error amplifier 23 through a diode 24 and to a current limit amplifier 25 through a resistance element 26. A first input terminal of amplifier 23 is connected to a source of reference voltage whereas a second input terminal thereof is connected to the output terminal 14 of the power supply. The input terminal of the current limit amplifier 25 is connected to the current sensing circuit 30.

The current sensing circuit 30 comprises the inductor 17 which as mentioned above may be part of the spike suppressor circuit normally found in a switched power supply. The inductor 17 includes a magnetic core 31 as described further below. A first magnetoresistive element 32 is positioned in flux coupling proximity to the inductor 17 and a second magnetoresistive element 33 is mounted in heat-sensing contact with the core 31 but substantially outside its flux path. The elements 32 and 33 are connected in series between ground and a source of voltage through a variable resistance element 34. The latter may be used to vary the current flowing through the magnetoresistive elements 32 and 33. The junction of the elements 32 and 33 is connected to the input terminal of the current limit amplifier 25.

FIG. 2 shows a practical embodiment of the sensing circuit of FIG. 1. The split loop core 31 is shown to be two identical C-type cores joined together at their mating surfaces to provide a pair of gaps 35 and 36. Although the core 31 is shown as being of the double C-type, it should be understood that any type of magnetic core which provides a gap may be used. For instance a core formed with a U-shaped member and an I-shaped member (U-I core) is suitable. The material of the core may be a ferrite or a lamination of steel plates. For example, the embodiment shown in FIG. 2 was realized using a laminated core of 0.002 inch thick 3% grain oriented silicon steel plates. The outside dimensions of the core were ¼ inch wide, ½ inch long and 0.125 inch thick.

The magnetoresistive element 32 is sandwiched between the halves of core 31 into the gap 36 with the large flat surfaces of the element being placed in intimate contact with the mating surfaces of the core. In order for the mating surfaces of the gap 36 to be flat against the surfaces of element 32, the gap 35 may be filled with a spacer 37 having approximately the same thickness as the element 32. For maximum magnetoresistive effect, the flat surface of the element 32 should be normal to the lines of flux in core 31. The second magnetoresistive element 33 is mounted on a surface of the core 31 and in intimate contact therewith. The magnetoresistive elements 32 and 33 may be commercially available units such as may be obtained from American Aerospace Controls Incorporated, Farmingdale, New York, under the code name of MRI-101. The winding 17 consists of a few turns of wire which may be conveniently wound on a plastic spool (not shown). The two parts of core 31 may be held securely in place with the use of epoxy resin and the entire unit may then be potted in the conventional manner.

In operation, the circuit of FIG. 1 functions in the manner conventional for a switched converter power supply. The control circuit 20 receives control signals from the sensing circuit 30 and the output terminal 14 and responds thereto by allowing more or less current to flow through the current control transistor 10. The current flowing from the transistor 10 to the output terminal 14 also flows through the inductor 17. The flux generated in the core 31 of the inductor 17 is proportional to the current therethrough. The resistance of the magnetoresistor element 32 which is placed in the gap 36 of the core varies with the quantity of flux therein. Since the element 32 is connected in a voltage divider or bridge circuit, the control signal fed at the input of the current limit amplifier 25 varies in accordance with the output current of the supply. If the output current increases, the control signal informs the control circuit 20 to allow less current through the transistor 10. Conversely, if the output current decreases, the series transistor is allowed to pass more current. It may also be seen that under a different control circuit configuration, the circuit may be arranged to turn off the power supply completely when the output current reaches a predetermined amount. The resistance of the second magnetoresistive element 33, which is mounted in heat sensing contact with the core 31, varies with its temperature. Therefore, as the temperature of the core 31 varies with the current passing through the inductor 17, the resistance of the element 33 varies accordingly. Since the element 33 is connected in the same bridge circuit as the element 32, the change in the control circuit due to the first element 32 is counteracted to a predetermined extent by the change in the control signal due to the second element 33 thereby providing regulation of the output current of the supply due to temperature drift.

It may be noted that in many cases, the use of the second magnetoresistive element 33 may not be necessary. In this case, the element 33 may simply be replaced with a normal resistance element or its absence compensated for with an adjustment of resistor 34.

It should also be observed that the abovedescribed current sensing circuit may be incorporated into almost any type of power supply. In mnay cases it may be possible to incorporate the circuit of the invention into existing power supplies by redesigning the core of the output inductor thereof.

What is claimed is:

1. In a current regulator for a power supply having a current control means connected serially between an input terminal and a corresponding output terminal of the power supply and a control circuit connected to the control means for controlling the current therethrough, a current sensing circuit for providing a control signal to said control circuit, comprising, an inductor connected between said control means and said output terminal of the power supply, said inductor comprising a coil wound on a magnetic core, a first magnetoresistive element positioned in flux coupling proximity to said inductor for varying said control signal in accordance with the current flowing through the inductor, and a second magnetoresistive element mounted in heat sensing contact with said core but substantially outside the flux path thereof, said second magnetoresistive element being responsive to the temperature of the core for varying said control signal thereby to compensate for thermal drift of the power supply.

* * * * *